United States Patent
Lehmann

(10) Patent No.: US 8,262,487 B2
(45) Date of Patent: Sep. 11, 2012

(54) BALL JOINT

(75) Inventor: Martin Lehmann, Hornberg (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/346,199

(22) Filed: Jan. 9, 2012

(65) Prior Publication Data

US 2012/0108348 A1    May 3, 2012

Related U.S. Application Data

(63) Continuation of application No. PCT/DE2010/000796, filed on Jul. 8, 2010.

(30) Foreign Application Priority Data

Jul. 10, 2009  (DE) .................. 10 2009 032 781

(51) Int. Cl.
  *F16D 3/223* (2011.01)
(52) U.S. Cl. ...................................... 464/146; 464/906
(58) Field of Classification Search .................. 464/139, 464/141–143, 145, 146, 167, 906; 384/49, 384/51
  See application file for complete search history.

(56) References Cited

U.S. PATENT DOCUMENTS

| 3,105,369 | A | * | 10/1963 | Mazziotti et al. | ............. | 464/145 |
| 3,176,477 | A | * | 4/1965 | Mazziotti | ...................... | 464/145 |
| 3,367,139 | A | * | 2/1968 | Ristau | ........................... | 464/145 |
| 3,464,232 | A | | 9/1969 | Hutchinson | | |
| 4,511,346 | A | | 4/1985 | Hazebrook et al. | | |
| 4,533,339 | A | | 8/1985 | Girguis | | |
| 5,292,285 | A | | 3/1994 | Ingalsbe et al. | | |
| 5,410,902 | A | | 5/1995 | Jacob | | |
| 5,643,091 | A | * | 7/1997 | Kozlowski | .................... | 464/906 |
| 6,666,771 | B2 | | 12/2003 | Boutin | | |
| 2003/0008716 | A1 | | 1/2003 | Boutin | | |
| 2007/0259724 | A1 | | 11/2007 | Pohl | | |

FOREIGN PATENT DOCUMENTS

| DE | 1 297 415 | 6/1969 |
| DE | 43 17 364 A1 | 12/1993 |
| DE | 10 2006 020 711 A1 | 11/2007 |

(Continued)

OTHER PUBLICATIONS

German Search Report with partial English translation dated Jul. 15, 2010 (nine (9) pages).

(Continued)

*Primary Examiner* — Gregory Binda
*Assistant Examiner* — Josh Skroupa
(74) *Attorney, Agent, or Firm* — Crowell & Moring LLP

(57) ABSTRACT

A ball joint having an inner hub which has an inner hub axis and an outer surface, in which inner races and cage guide surfaces are arranged in the inner hub; an outer hub which has an outer hub axis and an inner surface, in which outer races and cage guide surfaces are arranged in the outer hub, and a cage which is ring-shaped and has a cage axis. The inner surface of the cage extends in the direction of the cage axis, the outer surface of the cage extends away from the direction of the cage axis, an inner race is constructed to extend straight and/or parallel to the inner hub axis, and an outer race is constructed to extend straight and/or parallel to the outer hub axis.

10 Claims, 4 Drawing Sheets

FOREIGN PATENT DOCUMENTS

| | | |
|---|---|---|
| EP | 1 669 622 A1 | 6/2006 |
| EP | 1 845 274 A1 | 10/2007 |
| EP | 2 149 719 A1 | 2/2010 |
| EP | 2 180 202 A1 | 4/2010 |
| FR | 2 512 141 | 3/1983 |
| FR | 2 689 947 A1 | 10/1993 |
| JP | 53-57341 A | 5/1978 |

OTHER PUBLICATIONS

International Search Report with English translation dated Dec. 27, 2010 (six (6) pages).

* cited by examiner

BALL JOINT

CROSS REFERENCE TO RELATED APPLICATIONS

This application is a continuation of international patent application no. PCT/DE2010/000796, filed Jul. 8, 2010 designating the United States of America and published in German on Jan. 13, 2011 as WO 2011/003401, the entire disclosure of which is incorporated herein by reference. Priority is claimed based on Federal Republic of Germany patent application no. DE 10 2009 032 781.9, filed Jul. 10, 2009, the entire disclosure of which is likewise incorporated herein by reference.

BACKGROUND OF THE INVENTION

The present invention relates to a ball joint, having an inner hub with an inner hub axis and an outer surface, wherein inner races and cage guide surfaces are arranged in the inner hub, having an outer hub with an outer hub axis and an inner surface, wherein outer races and cage guide surfaces are arranged in the outer hub, wherein an inner race which lies opposite each of the outer races forms a pair of races with the same, and having a cage which is substantially ring-shaped and has a cage axis, an inner surface, an outer surface, and two edges which bound the inner surface and the outer surface, wherein the cage is arranged between the inner hub and the outer hub, wherein the cage has windows corresponding to the number of pairs of races, and balls which engage in the inner races and outer races are guided in said windows. The joint is particularly for use in a vehicle.

Ball joints are used in the prior art, by way of example in the drive train of motor vehicles. In this case, the balls serve to transmit force between an outer hub and an inner hub. A cage holds the balls in a plane. U.S. Pat. No. 3,464,232 (=DE 12 97 415) describes a universal joint having straight, axially parallel grooves for receiving the balls. US 2007/0259724 (=DE 10 2006 020 711) describes a cage for a joint which has a greater wall thickness in the edge region thereof compared to the middle region around the windows. Additional examples of joints are disclosed in the documents U.S. Pat. No. 4,511, 346, US 2003/0008716 A1 and U.S. Pat. No. 5,292,285 (=DE 43 17 364). A principal aspect of ball joints is the guiding of balls in their courses. Solutions proposing improvements over the prior art mostly involve higher costs as well.

SUMMARY OF THE INVENTION

It is the object of the present invention to provide a ball joint in which the balls are adequately guided and the cost is reduced to the greatest extent possible.

These and other objects are achieved in accordance with the present invention by providing a ball joint in which the inner surface of the cage is constructed in such a manner that the inner surface and/or an envelope of the inner surface extends at least sectionally toward the cage axis from an edge, the outer surface of the cage is constructed in such a manner that the outer surface and/or an outer surface envelope extends from an edge at least sectionally away from the cage axis, at least one inner race is constructed to extend substantially straight and/or parallel to the inner hub axis, and in that at least one outer race is constructed to extend substantially straight and/or parallel to the outer hub axis. The ball joint is particularly a slip joint with an angle compensation function, similar to those which can be used for a drive shaft in automotive applications, for example. In this case, the inner surface of the cage is at least partially tilted toward the inside, and the outer surface of the cage is at least partially tilted toward the outside. The region of the inner surface which is closest to the cage axis is preferably situated at the height of the middle of the at least one window. In other words, the interior of the cage is at least partially narrower in the direction of the middle of the window, proceeding from the edge.

In one embodiment, the inner surface of the cage is constructed as rotationally symmetrical along the cage axis. In this case, the course thereof can be continuous and smooth. In an alternative variant, the interior of the cage can become narrower in an uneven, e.g. step-wise manner. In a further embodiment, the inner surface has a rolling construction which results in the narrowing thereof. In this case, the envelope itself also describes the contour of the inner surface, and particularly connects each of the segments of the inner surface which project the farthest into the interior to each other. With this design comes the fact that at segments where the angle thereof penetrates into the interior, segments which run parallel to the axis can abut the same. As such, the edge of the cage can also initially have such an axially parallel region, wherein an angled region abuts the same. The cage serves, by way of example, to guide the balls in a minimum angle slip joint, wherein the range of possible tilt in the joint is restricted to an angle smaller than 6°.

In one embodiment, the inner surface of the cage extends from the edge of the cage in the direction of the cage axis at a first groove angle. The groove angle preferably defines the angle at which the inner surface tilts inward from the edge into the interior. This means that, in the case of a cage with a smooth, entirely hollow cylindrical inner surface, the same therefore not being an inner surface according to the invention, this groove angle would be equal to zero. In the prior art, the ball races are mostly either curved or angled with respect to the axis of rotation of the joint. If the ball races are even and axially parallel, the complexity inherent in the manufacturing process is considerably reduced. However, in this case, it is important that the axially parallel ball races do not exert any forces on the balls, or more generally on the rolling bodies, wherein said forces determine the position thereof. A cage according to the prior art holds the rolling bodies in a common plane, but the design thereof cannot prevent the arbitrary tilting thereof. The cage according to the invention addresses this problem particularly by restricting the range of motion of the balls accordingly. In one embodiment, a cross-section of the cage results which is at least partially, and substantially rhombic.

The following embodiments refer to the inner surface of the cage, such that the envelope, for example, also describes the design of the inner surface. In one embodiment of the cage, the inner surface and/or the envelope extends, at least inside a strip which runs between both edges, from an edge in the direction of the cage axis, at least in sections. This strip or strips is/are particularly the segments of the cage in which there is no window. As such, these are particularly the segments which are in contact in the ball joint with the guide surfaces of the cage.

In one embodiment, the inner surface of the cage, and/or the envelope, extends from an edge at least sectionally in the direction of the cage axis. In this embodiment, the inner surface of the cage projects into the interior space from both edges.

In a further embodiment, both regions of the inner surface of the cage which are angled toward the inside meet each other substantially at the middle of the cage, and/or at the height of the middle of the window. In this case as well, the embodiment of the inner surface of the cage is particularly rotationally symmetrical.

In a further embodiment, the inner surface of the cage is particularly axially symmetrical to a middle axis of the cage. In a further embodiment, the inner surface of the cage and/or the envelope extends, at least inside a strip which runs between both edges, from each of the edges to a common region, at least sectionally in the direction of the cage axis.

In a further embodiment, the entire inner surface of the cage is constructed in this way. The inner surface of the cage in this case is angled into the interior space starting from both edges, until both of the inner sub-surfaces which angle into the interior space meet each other.

In one embodiment, this point is instead the average height of the cage. In another embodiment, this point is the height of the middle of the window. In this region, a rotationally symmetrical point, or a flattening, or a rounded structure is provided, for example. As such, the inner surface takes on a shape similar to a V or a U depending on the embodiment, wherein the point of the capital V and/or U in one embodiment is particularly situated at the height of the periphery of the ring-shaped cage, wherein the middle of each of the windows is also situated at this point. This is particularly the case if multiple windows are provided which are aligned substantially on the same periphery.

In one embodiment, the inner surface of the cage, and/or the envelope, extends from each of the edges at least sectionally in the direction of the cage axis, with a first groove angle and a second groove angle.

In one embodiment, the first groove angle and the second groove angle of the inner surface of the cage are substantially identical. In another embodiment, the first groove angle and the second groove angle are different. In one embodiment, the first groove angle and/or the second groove angle is less than or equal to 3°, and preferably less than or equal to 1°. In each case, this is the angle with respect to a cylindrical cage constructed with a straight interior.

The following embodiments refer to the outer surface of the cage. In these cases, the variants are similar to the embodiments of the inner surface, while the difference is the direction of the surface.

In one embodiment of the cage, the outer surface and/or the envelope extends, at least inside a strip which runs between both edges, from one edge away from the direction of the cage axis, at least in sections. In one embodiment, the outer surface of the cage, and/or the envelope, extends from an edge at least sectionally away from the direction of the cage axis.

In a further embodiment, the outer surface of the cage and/or the envelope extends, at least inside a strip which runs between both edges, from each of the edges to a common region, at least sectionally away from the direction of the cage axis. As such, the embodiment given above for the inner surface also applies to the outer surface with respect to a possible V or U shape.

In one embodiment, the regions in which each of the regions of the angled inner surface and/or the outer surface meet each other are situated at the same height. As such, in the case of the V-shaped embodiment, the points which are preferably each rotationally symmetrical are situated facing inward and/or facing outward on the same periphery of the cage. As such, in one embodiment, for example, the cage has a wall thickness which increases from the edge toward the middle.

In one embodiment, the outer surface of the cage, and/or the envelope, extends from an edge at least sectionally away from the direction of the cage axis starting from each of the edges, with a first groove angle and a second groove angle. In one embodiment, the first groove angle and the second groove angle of the outer surface of the cage are substantially identical.

In one embodiment, the first groove angle and the second groove angle are different. In this case, the groove angles are each defined with respect to the embodiment of the outer surface.

In one embodiment, the groove angles of the inner surface and the outer surface are each equal in pairs which are defined with respect to the same edge. In one embodiment, the first groove angle and/or the second groove angle of the outer surface of the cage and/or of the envelope is less than or equal to 3°, and preferably less than or equal to 1°.

In one embodiment, the at least one window of the cage has a substantially circular cross-section, or the at least one window has a substantially elliptical cross-section, or the at least one window has a substantially rectangular cross-section, wherein the same is particularly provided with edges which are rounded off, or the at least one window has a cross-section which narrows at least in sections in the direction of the cage axis and expands laterally thereto.

In one embodiment, the long axis of the substantially elliptical cross-section is substantially perpendicular to the cage axis.

In one embodiment, n windows of the cage are provided, wherein n is a natural whole number. In one embodiment, n is an even number. In one embodiment, n is a whole-number multiple of four.

In one embodiment, a substantially equal dihedral angle exists between each of two windows. As such, the windows are preferably arranged symmetrically, such that particularly the strips having windows have substantially equal widths, and the strips without windows have substantially equal widths. In one embodiment, the cage is constructed with one or more parts.

In one embodiment, the at least one window is constructed to at least partially receive at least one ball. In one embodiment, at least one of the groove angles of the inner and/or outer surface corresponds to half the tilt angle of the ball joint. As such, if the ball joint tilts at a maximum angle of 2°, for example, (which is consequently the articulation angle of the joint), then at least one groove angle, or even all groove angles, are substantially 1°.

In one embodiment, the at least one window and the at least one ball are constructed in such a manner and are adapted to each other such that the at least one ball is substantially free of play inside the window at least in the direction of the cage axis. The reduction of the play of the balls in the axial direction prevents the possibility of the balls becoming jammed.

In one embodiment, the ball joint is a ball joint which can move axially, or is a constant velocity ball joint or a fixed constant velocity ball joint which is particularly able to move axially.

In one embodiment, the ball joint has an articulation angle which is less than or equal to 6°, and preferably less than or equal to 2°.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF ILLUSTRATIVE EMBODIMENTS

Figure 1:
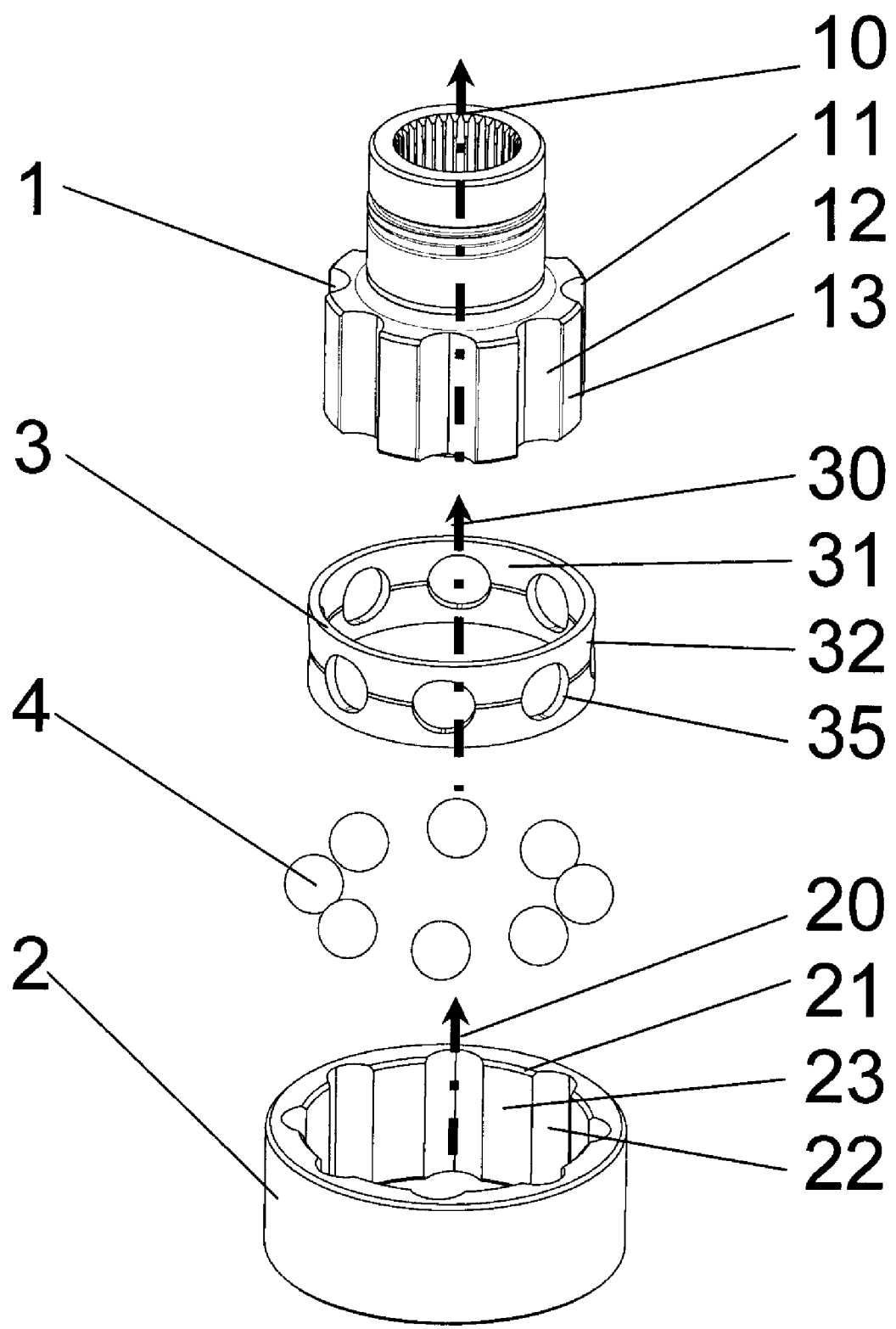
FIG. 1 shows an exploded view of a ball joint according to the invention.

FIG. 1 shows an exploded view of a ball joint according to the invention. The outer hub 2 can be seen, with the outer races 22 for the balls 4 in the inner surface 21 thereof. The outer races 22 in this case are inserted into the inner surface 21 symmetrically in the direction of the outer hub axis 20, and alternate with the cage guide surfaces 23 which are substantially straight, meaning that the same are not curved cylinder segments. In this embodiment, the outer races 22 are straight and particularly run parallel to the outer hub axis 20. The same applies for the cage guide surface 23. The balls 4, the cage 3, and the inner hub 1 are inserted into the outer hub 2, the same being at least indirectly connected to a shaft, for example. The balls 4 serve to transmit torque between the inner hub 1 and the outer hub 2.

The inner hub 1 in this case is constructed for the purpose of attachment to a further shaft or to a further section of a shaft, or for attachment to a wheel, to a differential, or to a transmission, for example. In this embodiment, the inner hub 1 also has straight inner races 12 in its outer surfaces 11, and said inner races 12 likewise run parallel to the inner hub axis 10. The inner races 12 alternate with the cage guide surfaces 13, the same also being straight and axially parallel. The embodiment of the inner hub 1 and the outer hub 2, with straight and axially parallel races 12, 22 simplifies the manufacture thereof.

The individual ball races 12, 22 in this case lie opposite each other when the device is assembled, and form pairs of ball races. In this case, one ball 4 can be inserted into each of the pairs of ball races. The cage 3 holds balls 4, which number eight in this embodiment, in one plane, and the embodiment according to the invention prevents the balls 4 from jamming. The cage 3 itself is substantially ring-shaped and has multiple windows 35 corresponding to the number of the balls 4. The inner surface 31 and the outer surface 32 of the cage 3 can be seen, as well as the cage axis 30 thereof. The window 35 and the balls 4 in this case are preferably constructed in such a manner and adapted to each other such that the balls 4 have substantially no free play at least in the axial dimension. The cage 3 is guided via the cage guide surfaces 13, 23 in the axial direction by the inner hub 1 and/or the outer hub 2. The axes of the inner hub 10 and the outer hub 20 coincide when the joint is assembled. The angle of inclination of the cage axis 30 to the axes of the inner hub and/or the outer hub in this case is the articulation angle of the joint. The maximum value thereof is determined by the construction of the components and their adjustment to each other.

Figure 2:
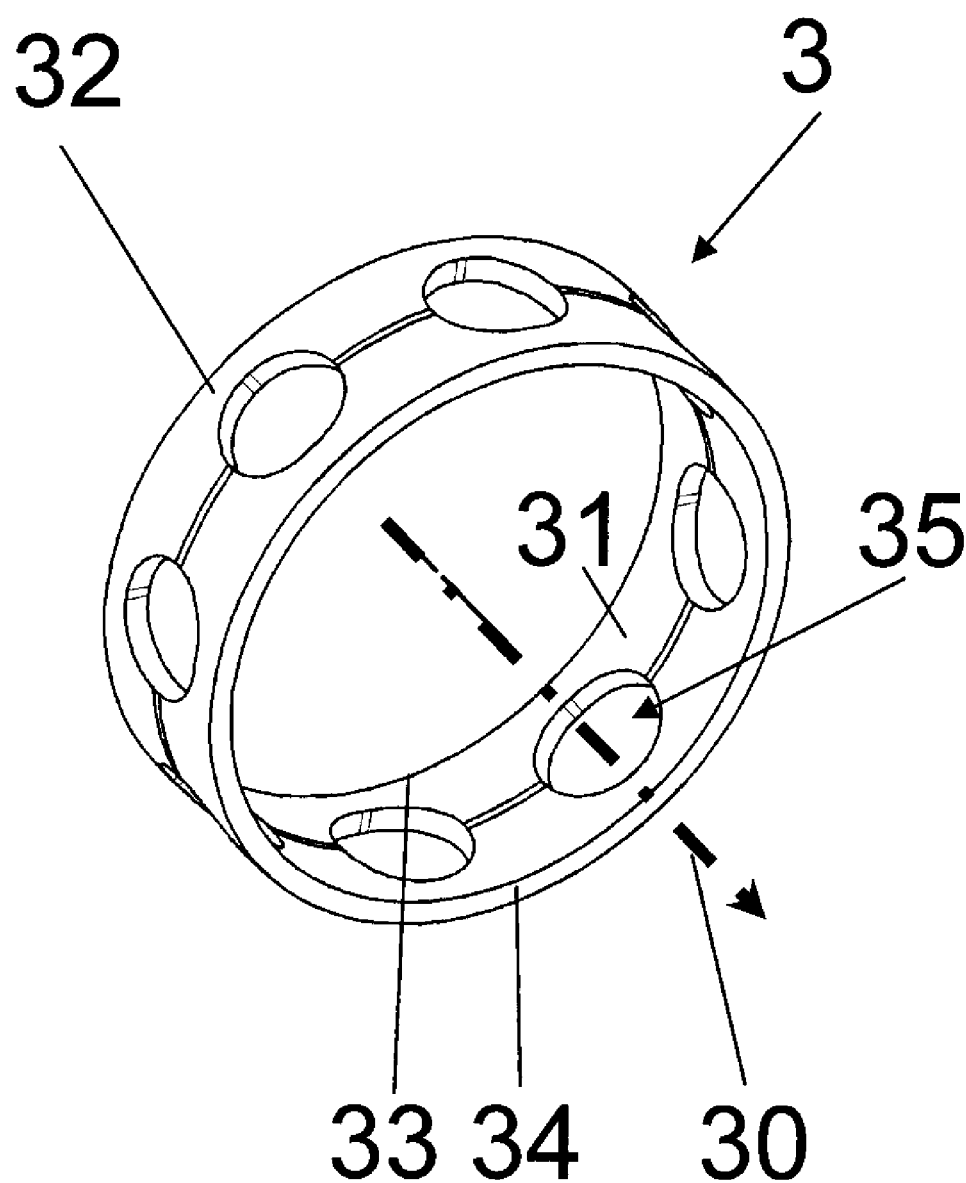
FIG. 2 shows a perspective view of a ball cage.

FIG. 2 shows a cage 3 which is substantially ring-shaped and/or cylindrical. The inner surface 31 and the outer surface 32 are bounded by two edges 33, 34, and consist alternately of longitudinal sections or longitudinal rods with and without windows 35, said sections and or rods running in the direction of the cage axis 30. The sections having windows 35 are located, in the assembled joint, between the races of the inner and the outer hubs, and guide the balls in the pairs of races. Each of the sections without windows, the same abutting the above sections with windows, come into contact with the cage guide surfaces of both hubs. At least the longitudinal regions, i.e. the regions which are guided by means of the cage guide surface, each have a structure between the windows 35 which faces into the interior space of the cage 3, and therefore effect a narrowing of said interior space. In this embodiment, the inner surface 31 is constructed as rotationally symmetrical. Furthermore, the inner surface 31 extends toward the cage axis 30 from both edges 33, 34, meaning that the interior space of the cage 3 becomes narrower from both sides in the direction of the middle, wherein the latter is determined particularly by the middle of each window 35. The outer surface 32 is angled outward in this embodiment. On the inner side 31 and/or the outer side 32, the inclinations originating from each of the edges 33, 34 do not come to a point in this case, but rather merge into a flattened region as indicated here.

Figure 3:
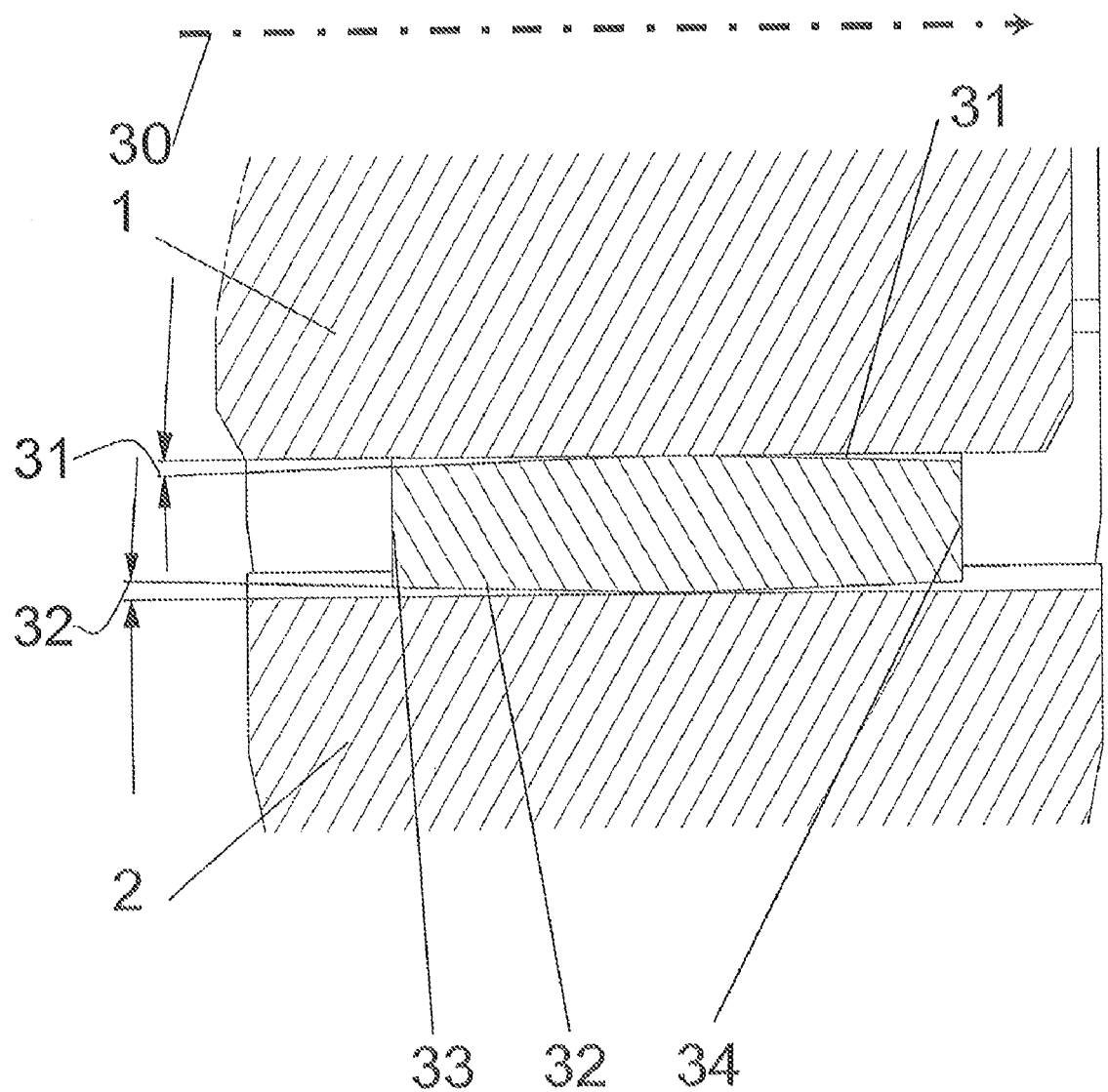
FIG. 3 shows an enlarged sectional view through a ball joint.

FIG. 3 shows a sectional view through a side of the ball joint. The illustration includes the cage axis 30, the inner hub 1, the outer hub 2, and the cage 3 between said hubs. The surfaces 31, 32 of the cage 3 have a groove angle of 1° in this case. This necessarily means that the joint achieves a maximum articulation of 2°, meaning that the groove angle corresponds to half the maximum articulation value of the joint. The cage 3 has a small clearance from the outer hub 2. The cage guide surfaces are constructed as substantially straight cylinder segments. The inner surface 31 in this case moves from each of the edges 33, 34 in the direction of the cage axis 30, and the outer surface 32 continues the movement from the same. The thickness of the wall of the cage 3 therefore increases in this embodiment from the edges 33, 34 to the interior, and particularly up to the height of the middle.

Figure 4:
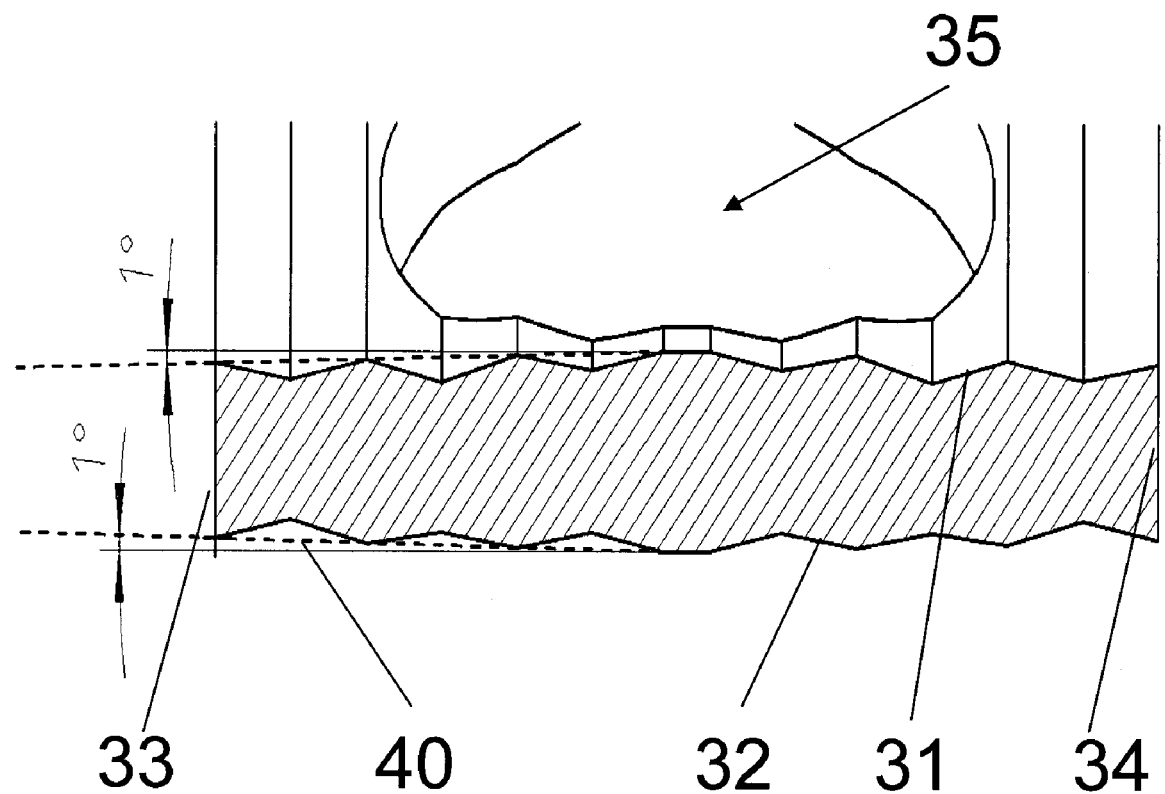
FIG. 4 shows a sectional view through a cage of a further embodiment.

FIG. 4 shows a course of the inner surface 31 and the outer surface 32. This course is not continuous, but rather proceeds stepwise, and in a zig-zag fashion in this case. In this case, the envelope 40 is defined segmentally by each of the regions of the respective sub-surface which project the farthest outward. The regions which project the farther inward or outward in this case are substantially even with the height of the middle of the cage 3. Because the inner surface 31 and/or the outer surface 32 come into contact with the cage guide surfaces, the uneven course shown here reduces the contact surface. In a further embodiment, the surfaces are rolling or spherical at least in sections thereof. The "valleys" appearing in the variant illustrated here also enable, by way of example, the same to receive lubricant. As an alternative, the course can also be shaped like steps.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A ball joint comprising:
    an inner hub having an inner hub axis and an outer surface, in which inner races and cage guide surfaces are arranged in the inner hub;
    an outer hub having an outer hub axis and an inner surface, in which outer races and cage guide surfaces are arranged in the outer hub, wherein an inner race is disposed opposite each outer race to form a race pair therewith;
    a substantially ring-shaped cage having a cage axis, an inner surface, an outer surface, and two edges which bound the inner surface and the outer surface, said cage being arranged between the inner hub and the outer hub and having windows which correspond to the number of race pairs; and
    a plurality of balls guided in said windows and engaged in the inner and outer races, wherein
- the inner surface of the cage is constructed in such a manner that the inner surface and/or an envelope of the inner surface extends from the two edges of the cage in the direction of the cage axis, at least in sections;
- the outer surface of the cage is constructed in such a manner that the outer surface and/or an envelope of the outer surface extends from the two edges of the cage away from the direction of the cage axis, at least in sections;
- at least one inner race of the inner hub extends substantially straight and/or parallel to the inner hub axis;
- at least one outer race of the outer hub extends substantially straight and/or parallel to the outer hub axis;
- at least one section of the inner surface of the cage having such a stepwise course that the envelope of the at least one section of the inner surface extends from an edge of the cage in the direction of the cage axis and/or at least one section of the outer surface of the cage having such a stepwise course that the envelope of the at least one section of the outer surface extends away from the direction of the cage axis;
- the cage holds the balls in a plane, and
- the windows and the balls guided therein are constructed in such a manner and are adapted to each other such that the balls are substantially free of play inside each window, at least in the direction of the cage axis.

2. The ball joint according to claim 1, wherein the inner surface of the cage and/or the envelope of the inner surface extends from each edge of the cage in the direction of the cage axis, at least in sections, with a first groove angle and a second groove angle.

3. The ball joint according to claim 2, wherein the first groove angle and/or the second groove angle is less than or equal to 3°.

4. The ball joint according to claim 3, wherein the first groove angle and/or the second groove angle is less than or equal to 1°.

5. The ball joint according to claim 1, wherein the outer surface of the cage and/or the envelope of the outer surface extends from each edge of the cage away from the direction of the cage axis, at least in sections, with a first groove angle and a second groove angle.

6. The ball joint according to claim 5, wherein the first groove angle and/or the second groove angle of the outer surface of the cage and/or of the envelope of the outer surface is less than or equal to 3°.

7. The ball joint according to claim 6, wherein the first groove angle and/or the second groove angle of the outer surface of the cage and/or of the envelope of the outer surface is less than or equal to 1°.

8. The ball joint according to claim 1, wherein the ball joint is a ball joint which can move axially.

9. The ball joint according to claim 1, wherein the ball joint is a constant velocity ball joint.

10. The ball joint according to claim 1, wherein the ball joint is a fixed constant velocity ball joint which is particularly able to move axially.

* * * * *